US007206813B2

(12) United States Patent
Dunbar et al.

(10) Patent No.: US 7,206,813 B2
(45) Date of Patent: Apr. 17, 2007

(54) METHOD, COMPUTER PROGRAM PRODUCT AND APPARATUS FOR IMPLEMENTING PROFESSIONAL USE OF INSTANT MESSAGING

(75) Inventors: Anthony Michael Dunbar, Rochester, MN (US); Gregory Richard Hintermeister, Rochester, MN (US); DeVaughn Lawrence Rackham, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 741 days.

(21) Appl. No.: 10/273,226

(22) Filed: Oct. 17, 2002

(65) Prior Publication Data

US 2004/0078435 A1     Apr. 22, 2004

(51) Int. Cl.
G06F 15/16          (2006.01)
(52) U.S. Cl. ...................................... 709/206
(58) Field of Classification Search ................ 709/203, 709/206, 217–219
See application file for complete search history.

(56) References Cited

U.S. PATENT DOCUMENTS

| 6,484,196 | B1* | 11/2002 | Maurille ............... 709/206 |
| 6,557,027 | B1* | 4/2003 | Cragun ................ 709/204 |
| 6,757,365 | B1* | 6/2004 | Bogard ................ 379/88.17 |
| 6,907,447 | B1* | 6/2005 | Cooperman et al. ...... 709/203 |
| 2001/0047305 | A1* | 11/2001 | Bowen, Jr. ............ 705/26 |
| 2002/0034281 | A1* | 3/2002 | Isaacs et al. .......... 379/88.12 |
| 2002/0130904 | A1* | 9/2002 | Becker et al. ......... 345/753 |
| 2002/0138588 | A1* | 9/2002 | Leeds ................ 709/217 |
| 2003/0030670 | A1* | 2/2003 | Duarte et al. ......... 345/758 |
| 2004/0019701 | A1* | 1/2004 | McGee et al. ......... 709/250 |
| 2004/0039779 | A1* | 2/2004 | Amstrong et al. ...... 709/204 |
| 2004/0078424 | A1* | 4/2004 | Yairi et al. ........... 709/203 |
| 2004/0078435 | A1* | 4/2004 | Dunbar et al. ......... 709/206 |
| 2004/0111479 | A1* | 6/2004 | Borden et al. ......... 709/206 |

OTHER PUBLICATIONS

U.S. Appl. No. 09/249,124 (RO99-220), filed Feb. 12, 1999, "Chat Room Post Threads".

* cited by examiner

Primary Examiner—Jason Cardone
Assistant Examiner—Minh-Chau Nguyen
(74) Attorney, Agent, or Firm—Joan Pennington

(57) ABSTRACT

A method, apparatus and computer program product are provided for implementing professional use of instant messaging. A flow of an IM conversation is displayed. Responsive to identifying a user selection to pair a response with a previous request, a user entered response and a user selected previous request are sent. Responsive to a user selection, a new topic is displayed in a new view and a new IM conversation is started. When an IM conversation is completed or a window is closed for the IM conversation; the IM conversation is automatically saved. Responsive to a user selection, another user is added to the IM conversation and a window including the flow of the IM conversation is displayed to the added user. An object can be linked to an IM conversation and the IM conversation is automatically saved with the selected object.

19 Claims, 9 Drawing Sheets

METHOD, COMPUTER PROGRAM PRODUCT AND APPARATUS FOR IMPLEMENTING PROFESSIONAL USE OF INSTANT MESSAGING

FIELD OF THE INVENTION

The present invention relates generally to the data processing field, and more particularly, relates to a method, apparatus and computer program product for implementing professional use of instant messaging.

DESCRIPTION OF THE RELATED ART

As used in the present specification and claims, instant messaging (IM) generally refers to interactive communications between participants, particularly between business users, and is not limited to any particular instant messaging system.

Instant messaging (IM) started as a quick little tool to communicate simple conversations between two people. Now, however, instant messaging has become a crucial communications tool for business professionals.

Due to the change in the use of instant messaging, problems have resulted that limit productivity, and more importantly, limit how efficiently business professionals can work. Related, in the current world of ISO 9000 quality audits, it is clear that informal IM conversations do not help in the documentation of decisions and issues.

Often it is confusing to have a conversation with a co-worker through IM because many times multiple topics will come up, and while responding to one question, a totally different question will appear. Because current IM technology is just single history based, questions and answers to different topics tend to cross paths with each other and can become very confusing.

A need exists for improved mechanism for implementing professional use of instant messaging.

SUMMARY OF THE INVENTION

A principal object of the present invention is to provide a method, apparatus and computer program product for implementing professional use of instant messaging. Other important objects of the present invention are to provide such method, apparatus and computer program product for implementing professional use of instant messaging substantially without negative effect and that overcome many of the disadvantages of prior art arrangements.

In brief, a method, apparatus and computer program product are provided for implementing professional use of instant messaging. A flow of an IM conversation is displayed. Responsive to identifying a user selection to pair a response with a previous request, a user entered response and a user selected previous request are received. Then the user entered response is sent following the user selected previous request.

In accordance with features of the invention, responsive to identifying a user selection to isolate a new topic, a user selected request in the flow of the IM conversation and a user selected new topic are received. The user selected request is displayed in a new view and a new IM conversation continues.

In accordance with features of the invention, responsive to identifying a completed IM conversation or a window closed for the IM conversation; the IM conversation is automatically saved.

In accordance with features of the invention, responsive to identifying a user entered view conversations option; and saved IM conversations are displayed. A user selection of a saved IM conversation is received and the selected IM conversation is continued.

In accordance with features of the invention, responsive to identifying a user selection to add another user to the IM conversation, another user is added to the IM conversation. A window including the flow of the IM conversation is displayed to the added user, while keeping other IM conversations private.

In accordance with features of the invention, responsive to identifying a user selection, a selected object is linked to an IM conversation. Responsive to identifying a completed IM conversation or a window closed for the IM conversation; the IM conversation is automatically saved with the selected object.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1A:
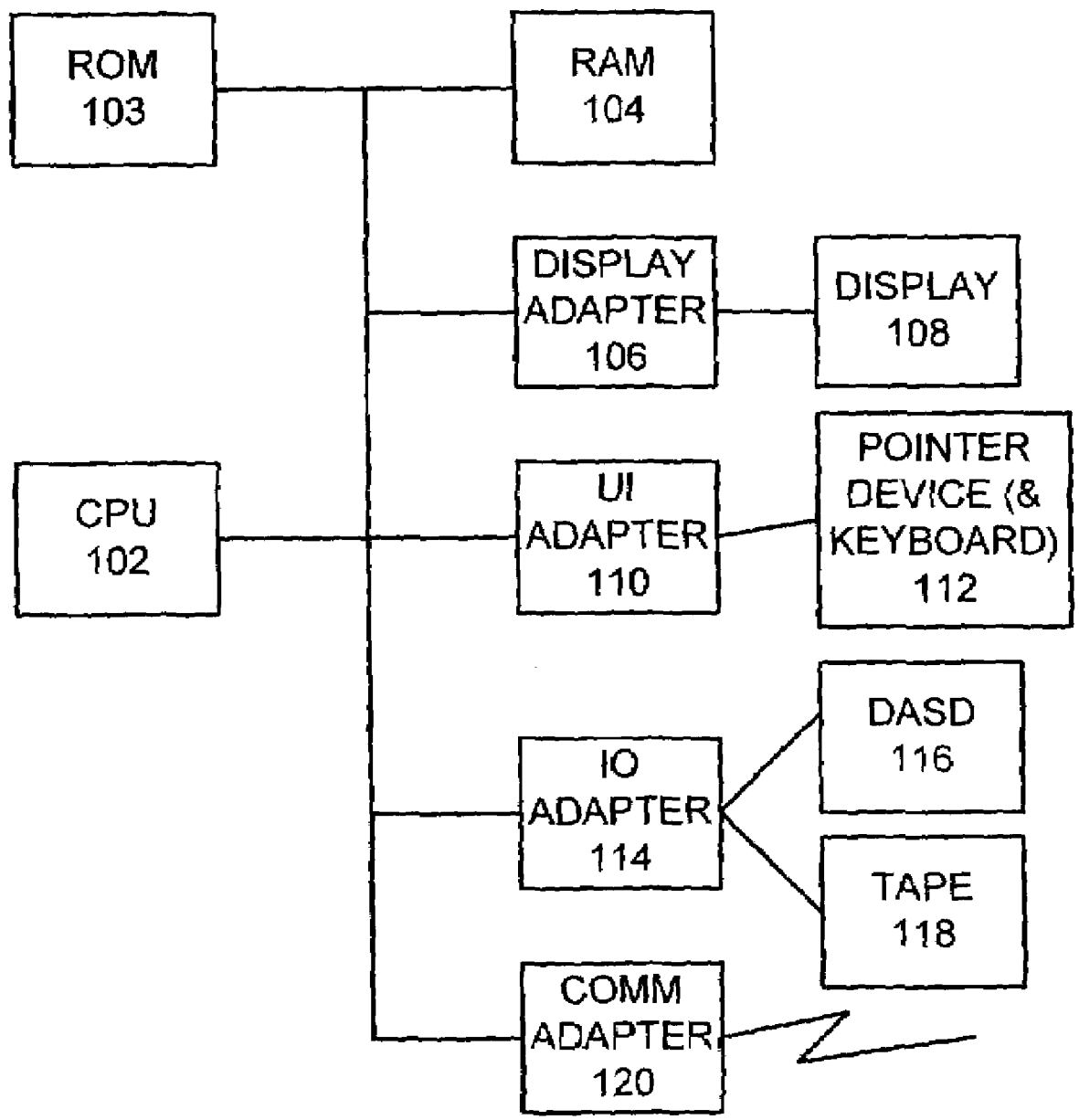
FIGS. 1A and 1B are block diagram representations illustrating a computer system and operating system for implementing methods for professional use of instant messaging in accordance with the preferred embodiment.
Figure 1B:
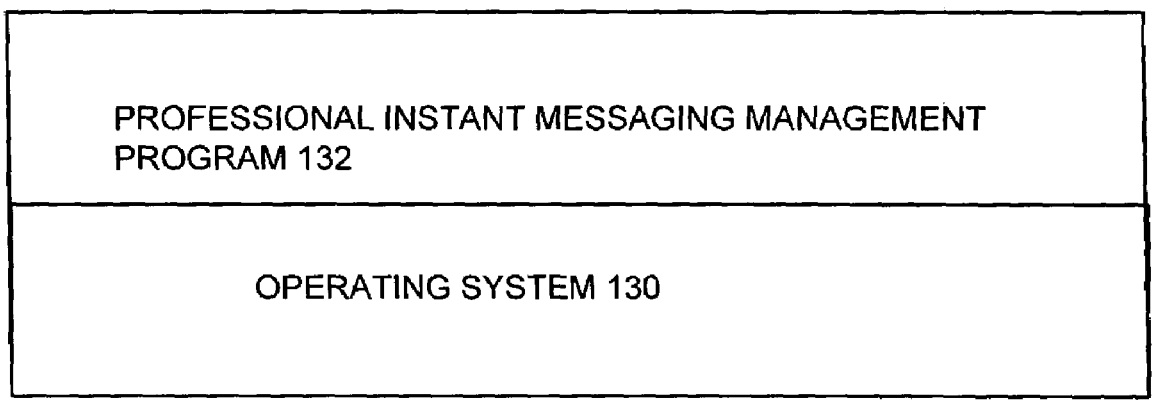

Having reference now to the drawings, in FIGS. 1A, and 1B, there is shown a computer or data processing system generally designated by the reference character 100 for implementing methods for professional use of instant messaging of the preferred embodiment. As shown in FIG. 1, computer system 100 includes a central processor unit (CPU) 102, a read only memory 103, a random access memory 104, a display adapter 106 coupled to a display 108. CPU 102 is connected to a user interface (UI) adapter 110 connected to a pointer device and keyboard 112. CPU 102 is connected to an input/output (10) adapter 114 connected to a direct access storage device (DASD) 116 and a tape unit 118. CPU 102 is connected to a communications adapter 120 providing a communications function.

As shown in FIG. 1B, computer system 100 includes an operating system 130 and a professional instant messaging management program 132 for implementing methods for professional use of instant messaging of the preferred embodiment. It should be understood that the present invention is not limited to a computer model with a single CPU, or other single component architectures as shown in FIG. 1A.

In accordance with features of the invention, some problems encountered in conventional instant messaging systems are solved. Effectively working with multiple topics in a single conversation is enabled for business professionals. Saving and continuing conversations at a later time is enabled. Adding a third party to a conversation already in progress, and providing the added third party with the historical background needed to continue the conversation are enabled. Often an IM conversation starts because a user is working with an email or issue, for example, a Lotus Note issue, has a question, then the user instant messages the author of the email or issue. However, such IM conversations are totally separate from the issue and a need exists to connect the conversation with that issue. Associating a conversation with an object, for example, a Lotus Notes issue, is enabled so that the conversation is preserved, and in the future could be viewed and even continued.

In accordance with a feature of the invention, professional instant messaging management program 132 of the preferred embodiment enables business professionals to effectively manage multiple topics in a single conversation. During a IM conversation, while typing a response, a separate question will come in. The user will simply select the question he is answering first, and that question will be displayed right before the response. For example, if I respond to a previous question, the history would say "You said: <insert question>" I say: <insert answer I just typed>". This solves many problems because the user can quickly associate responses with the proper questions.

Figure 2:
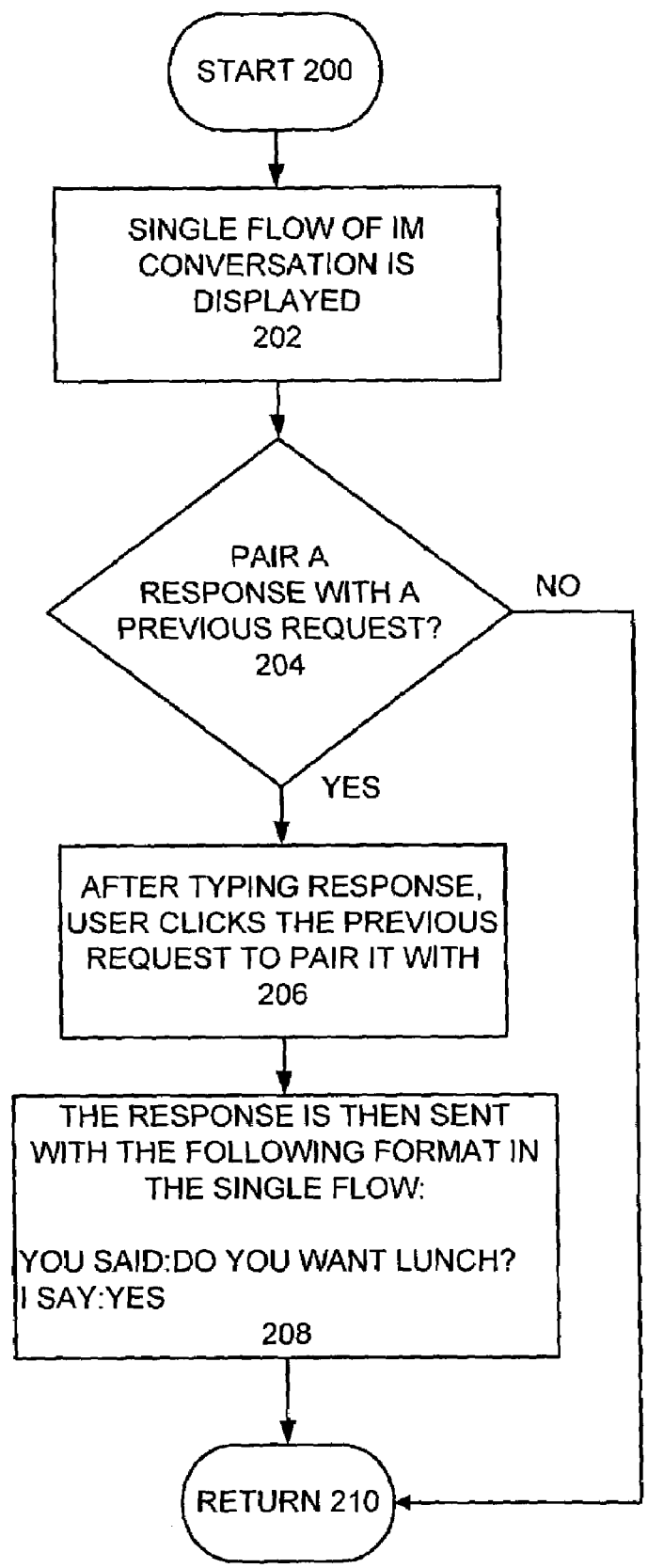
FIGS. 2, 3, 4, 5, and 6 are flow charts illustrating exemplary steps for implementing professional use of instant messaging in accordance with the preferred embodiment.

Referring now to FIG. 2, there are shown exemplary steps for implementing professional use of instant messaging of the preferred embodiment starting at a block 200. A single flow of an IM conversation is displayed as indicated in a block 202. Checking for a user selection to pair a response with a previous request is performed as indicated in a decision block 204. If not, then the sequential steps return as indicated in a block 210. When the user selects to pair a response with a previous request, the user after typing response, clicks the previous request to pair with the response as indicated in a block 206. The response is sent with the selected request displayed before the response as indicated in a block 208. The result is that within the same flow, short detours into separate topics can be easily clarified by a quick click of a mouse. There is still one history, but clarity is gained by adding context of identifying a particular original request. Then the sequential steps return as indicated in a block 210.

In accordance with another feature of the invention, professional instant messaging management program 132 of the preferred embodiment enables business professionals to effectively start a new topic and preserve a history of the new topic in a single conversation. In some cases, two different topics are significant enough that each needs to be treated independently, so there needs to be a way to converse about two different topics at the same time. This feature effectively implements one of the many advantages of using IM over conventional ways to communicate. For example, when are talking about a first topic # 1, a question is asked about another area of work, a second topic # 2 that deserves dedicated space or its own history so details are not lost. A user selects that question in the user's history and selects "new topic". Another pane appears in the current window with its own history and place for input allowing for dedicated focus on a conversation. The users can now converse about two different topics at the same time and each topic will have its own dedicated history and response space.

Figure 3:
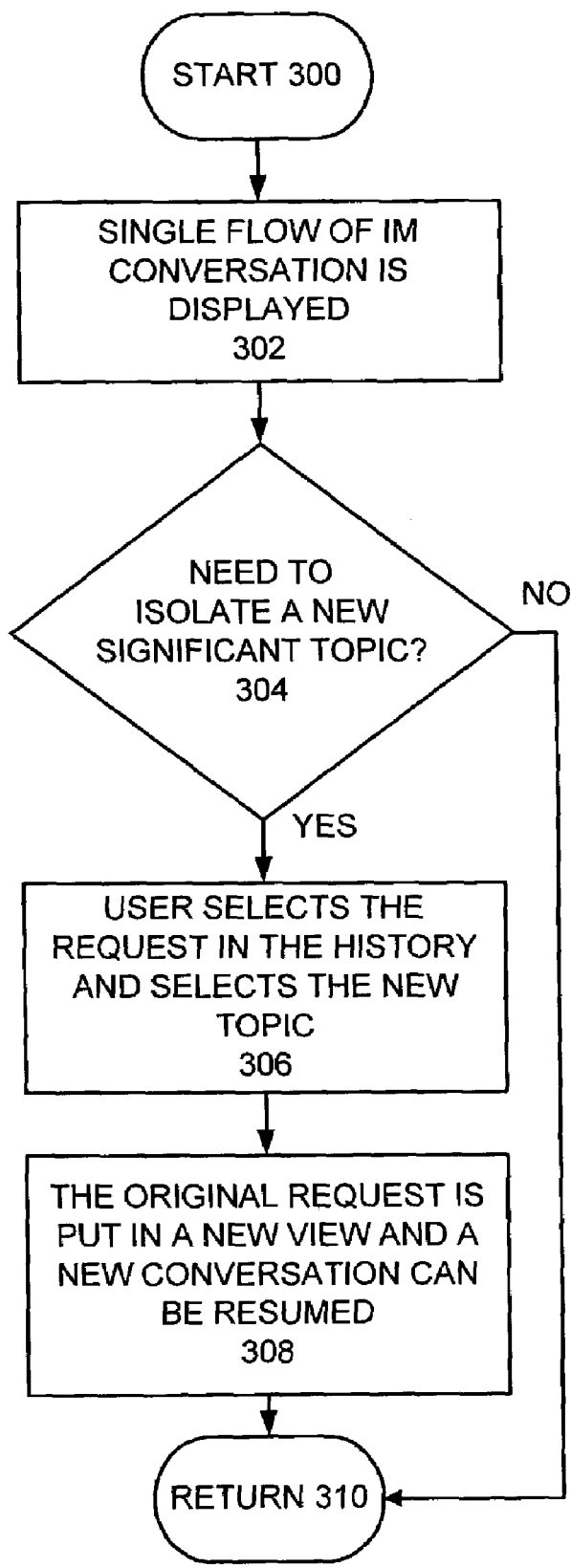

Referring now to FIG. 3, there are shown exemplary steps for implementing professional use of instant messaging of the preferred embodiment starting at a block 300. A single flow of an IM conversation is displayed as indicated in a block 302. Checking for a user selection to isolate a new significant topic is performed as indicated in a decision block 304. If not, then the sequential steps return as indicated in a block 310. If the user selects to isolate a new significant topic, the user selects the request in the history and selects a new topic as indicated in a block 306. The selected request is displayed in a new view and a new conversation can be resumed as indicated in a block 308. All IM conversations to a specific user are kept in one window, multiple topics can be discussed with each topic having its own history and separate view within the window so that confusion is avoided. A separate topic is not lost in the middle of another topic. Then the sequential steps return as indicated at block 310.

In accordance with another feature of the invention, professional instant messaging management program 132 of the preferred embodiment enables business professionals to effectively continue IM conversations at a later time. Many times an IM conversation starts and then ends. Later in the day, however, more information is received and the same conversation is needed because related history is already shown in the history of the first conversation. In accordance with features of the preferred embodiment, all conversations with users are automatically saved. When a user sees the user list on the IM GUI, the user can right click and select "view conversations". Previous IM conversations with that user are displayed and the user can select one of the stored previous IM conversations and continue the IM conversation. The unique thing is that the history of the IM conversation is preserved so both users in the conversation can see the history and refers to it. Otherwise, by just clicking on the user, a new IM conversation appears. There is a configurable option to modify how many conversations are stored.

Figure 4:
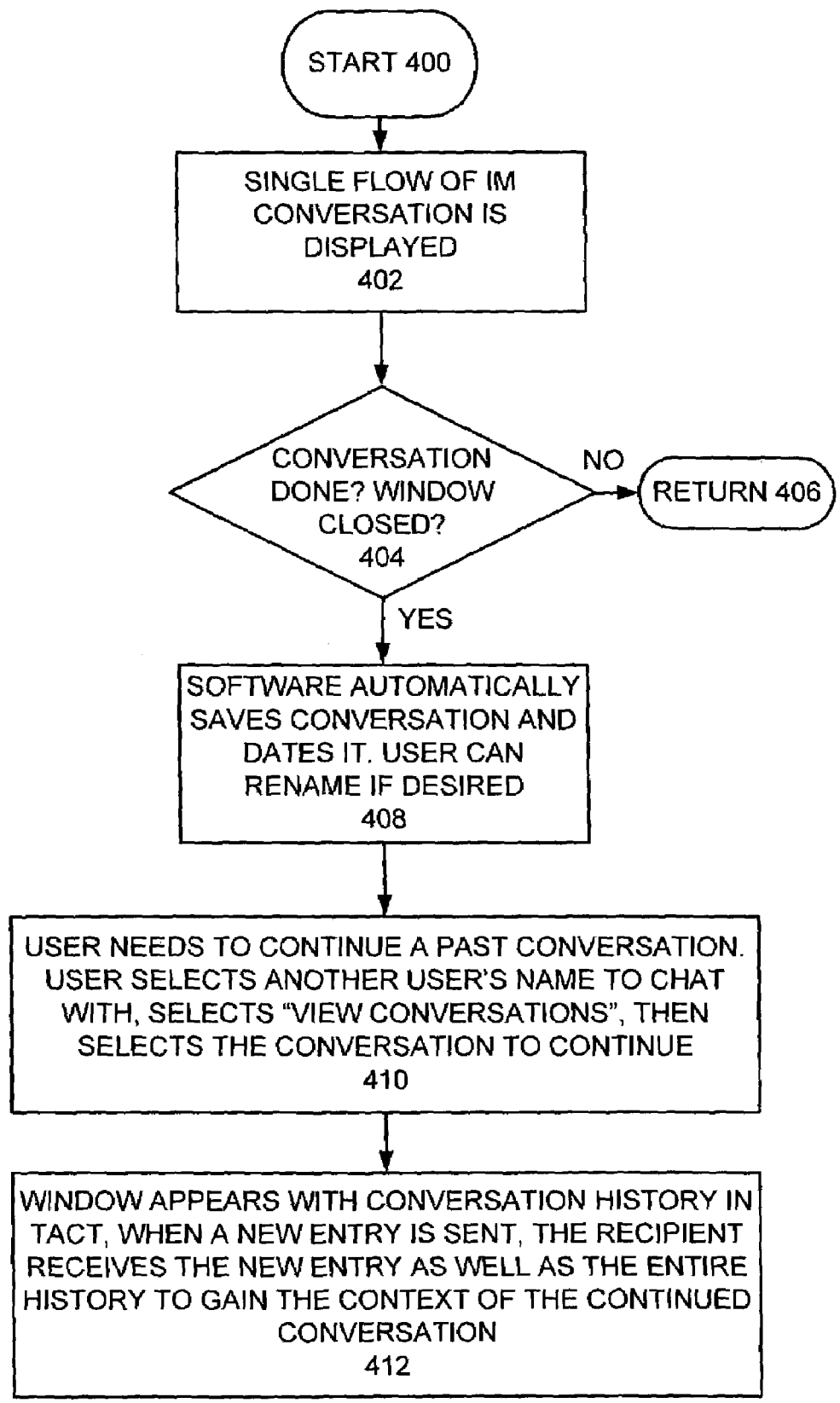

Referring now to FIG. 4, there are shown exemplary steps for implementing professional use of instant messaging of the preferred embodiment starting at a block 400. A single flow of an IM conversation is displayed as indicated in a block 402. Checking for a completed conversation or window closed is performed as indicated in a decision block 404. If not, then the sequential steps return as indicated in a block 406. When the conversation ends or the window is closed, the professional instant messaging management program 132 automatically saves and dates the conversation as indicated in a block 408. Also at block 408 a user can rename the conversation, if desired. When the user needs to continue a past conversation, the user selects another user's name and then selects to view conversations, the user selects a particular IM conversation to continue as indicated in a block 410. The selected IM conversation history is displayed in the user's window, and when a new entry is sent, the recipient receives the new entry as well as the entire IM conversation history to gain the context of the continued conversation as indicated in a block 412.

In accordance with another feature of the invention, professional instant messaging management program 132 of the preferred embodiment enables adding a third party to an IM conversation already in progress. In conventional IM systems, when a conversation is ongoing, and a third party is needed, a totally new window must be created and the history from the original conversation is lost. In accordance with features of the preferred embodiment, when a third party is needed, a user will simply drag another user onto a current IM conversation, the added party is sent a request to participate in the conversation, then a window showing the complete history of that conversation is shown to the added user. In addition, with multiple separate topics provided for IM conversations, a third party can be added to certain topics, while other topics can be kept private.

Figure 5:
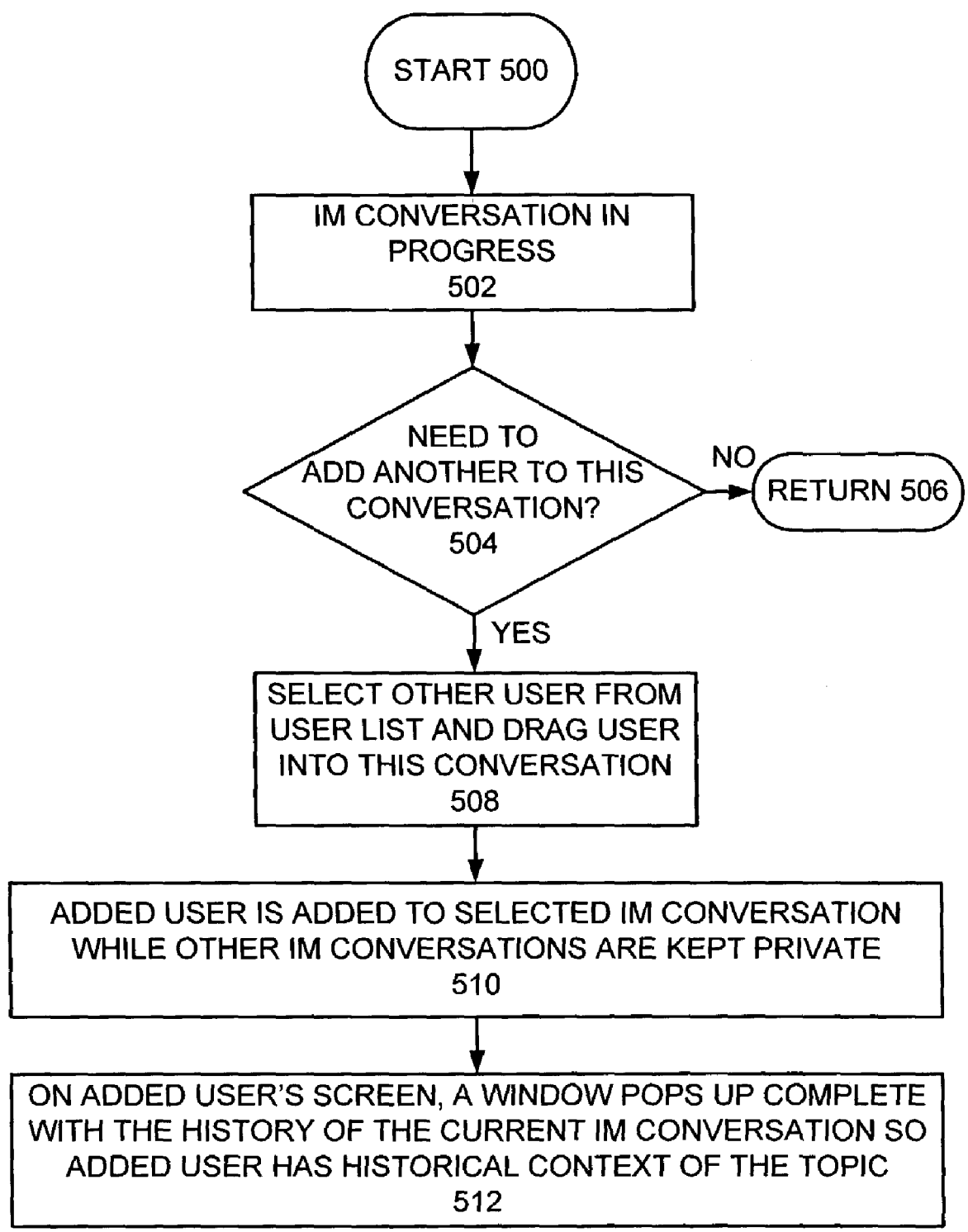

Referring now to FIG. 5, there are shown exemplary steps for implementing professional use of instant messaging of the preferred embodiment starting at a block 500. An IM conversation is in progress as indicated in a block 502. Checking for a user selection to add another user to the conversation is performed as indicated in a decision block 504. If not, then the sequential steps return as indicated in a block 506. If the user selects to add another user to the conversation, the user selects the other user from the user list and drags the user into the ongoing conversation as indicated in a block 508. The added user is only added to selected IM conversation, while other IM conversations are kept private as indicated in a block 510. On the added user's screen, a window is displayed complete with the history of the current IM conversation so that the added user has the historical context of the topic as indicated in a block 512.

In accordance with another feature of the invention, professional instant messaging management program 132 of the preferred embodiment enables linking IM with objects. This new feature is called "chat about". For example, IM can be linked to Lotus Notes email or issue, database entry, or any object viewable from computer system 100.

A common problem with a conventional IM conversation is regarding a Lotus Notes email or issue or database entry, and once the conversation is done, either the whole text has to be copied, or even worse, the history of the conversation is lost so the results have to be typed into the object of conversation, the email, issue, or the like. In accordance with features of the preferred embodiment, a way to associate an IM conversation with an object is provided. When the IM conversation is done, professional instant messaging management program 132 automatically saves the entire IM conversation history with that object so it can be viewed later, or if the object is sent the IM conversation history is attached to the object. These stored IM conversations can be continued if there is more information to communicate, the IM conversation history is continued in the same history and saved with the object.

Figure 6:
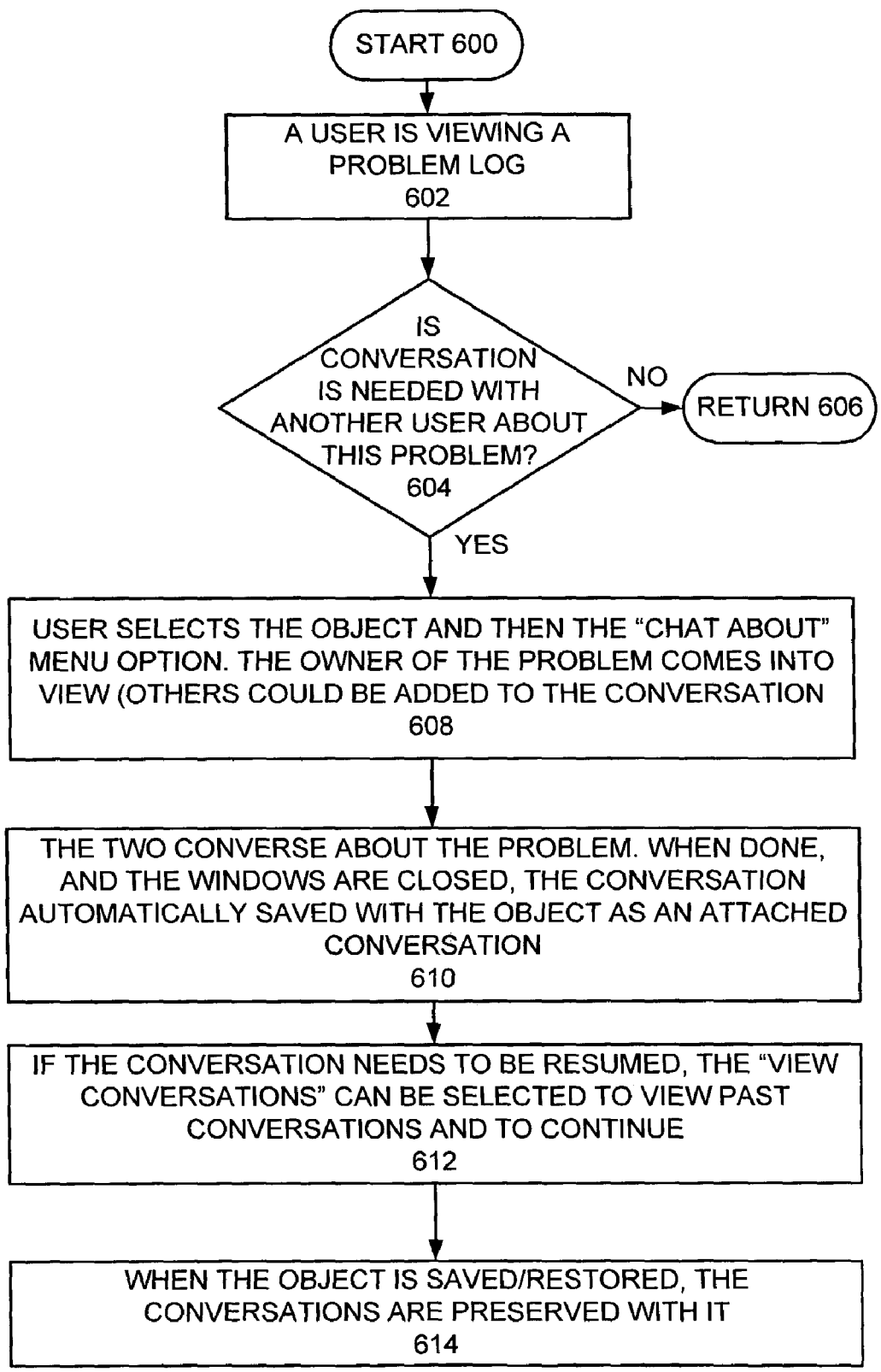

Referring now to FIG. 6, there are shown exemplary steps for implementing professional use of instant messaging of the preferred embodiment starting at a block 600. A user views an issue, for example, in a problem log as indicated in a block 602. The user has a question regarding it and needs to chat with the creator. Checking for a user selection for a conversation with another user, such as the creator of the object, about the problem or issue is performed as indicated in a decision block 604. The user selects the object, then the user selects the "chat about" menu option and the owner of the problem comes into view for the IM conversation as indicated in a block 608. Also more users can be added to the IM conversation as shown and described with respect to FIG. 5. The conversation occurs and when completed, the history of the IM conversation is automatically be stored with the issue or object as an attached conversation as indicated in a block 610. Later, when viewing the issue or object, "view conversations" is selected to see the results stored with the object at block 610. If more conversation is needed regarding the same topic, the user selects view conversations to view past conversations and to continue so that new information can be added to the IM conversation history and the single topic is preserved as indicated in a block 612. When the object is saved or restored, the IM conversations are preserved with the object as indicated in a block 614.

Figure 7:
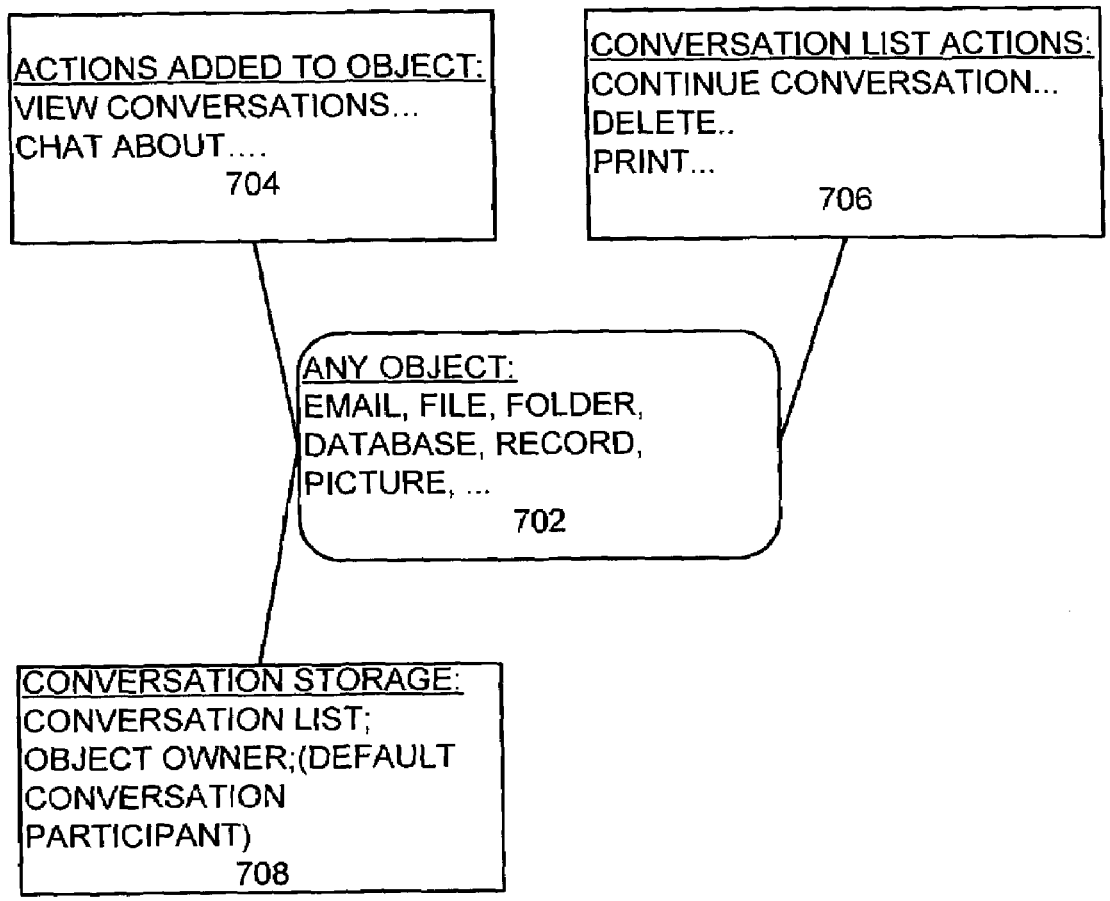
FIG. 7 is a block diagram illustrating an object layout in accordance with the preferred embodiment.

Referring now to FIG. 7, there is shown exemplary object layout for implementing the chat about feature of instant messaging of the preferred embodiment as illustrated and described with respect to FIG. 6. Any object includes email, file, folder, database, record, picture, and the like as indicated in a block 702. It should be understood that this chat about feature of the invention can be extended to any object, document or file that is on a shared computer, whether it be Lotus Notes, a mapped drive, or a shared internet location. Attached to the object 702 includes actions added to object, such as, view conversations, and chat about as indicated in a block 704. Attached to the object 702 includes conversation list actions, such as continue conversation, delete, print, and the like as indicated in a block 706. Attached to the object 702 includes conversation storage, such as conversation list, object owner or default conversation participant as indicated in a block 708.

Figure 8:
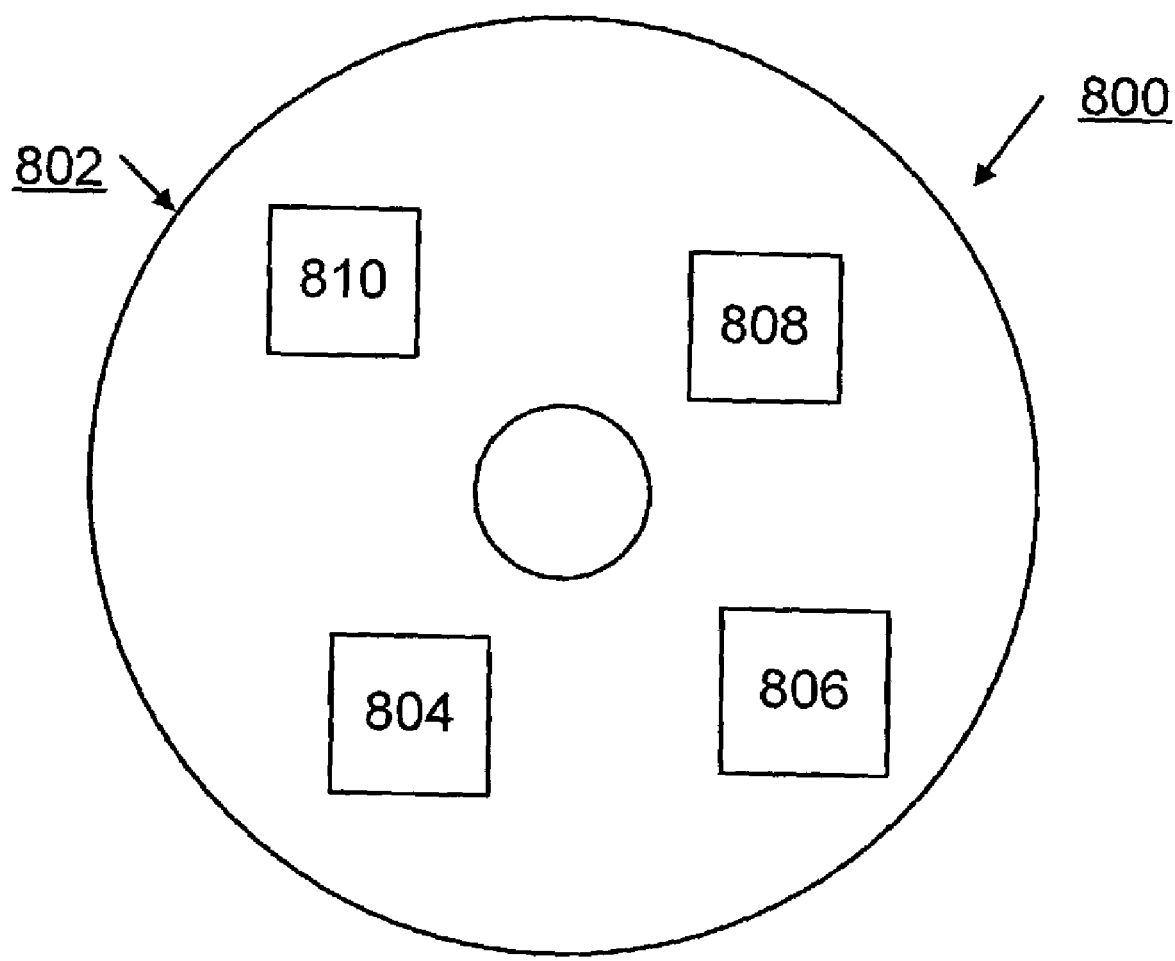
FIG. 8 is a block diagram illustrating a computer program product in accordance with the preferred embodiment.

Referring now to FIG. 8, an article of manufacture or a computer program product 800 of the invention is illustrated. The computer program product 800 includes a recording medium 802, such as, a floppy disk, a high capacity read only memory in the form of an optically read compact disk or CD-ROM, a tape, a transmission type media such as a digital or analog communications link, or a similar computer program product. Recording medium 802 stores program means 804, 806, 808, 810 on the medium 802 for carrying out the methods for implementing professional use of instant messaging of the preferred embodiment in the computer system 100 of FIGS. 1A and 1B.

A sequence of program instructions or a logical assembly of one or more interrelated modules defined by the recorded program means 804, 806, 808, 810, direct the computer system 100 for implementing professional use of instant messaging of the preferred embodiment.

While the present invention has been described with reference to the details of the embodiments of the invention shown in the drawing, these details are not intended to limit the scope of the invention as claimed in the appended claims.

What is claimed is:

1. A method for implementing professional use of instant messaging (IM) comprising the steps of:
    displaying a flow of an IM conversation;
    identifying a user selection to pair a response with a previous request from the displayed flow of the IM conversation,
    receiving a user entered response and said user selected previous request;
    sending both the user entered response and the user selected previous request with the user entered response displayed following the user selected previous request; and
    identifying a completed IM conversation or a window closed for the IM conversation; and automatically saving the IM conversation.

2. A method for implementing professional use of instant messaging as recited in claim 1 includes the steps of identifying a user selection to add another user to the IM conversation; and adding another user to the IM conversation.

3. A method for implementing professional use of instant messaging as recited in claim 2 includes the steps of displaying a window including the flow of the IM conversation to the added user.

4. A method for implementing professional use of instant messaging as recited in claim 3 includes the steps of displaying a selected IM conversation and keeping other IM conversation private from the added user.

5. A method for implementing professional use of instant messaging as recited in claim 1 includes the steps of identifying a user selection to isolate a new topic.

6. A method for implementing professional use of instant messaging as recited in claim 5 includes the steps of receiving a user selected request in the flow of the IM conversation and a user selected new topic; and displaying the user entered request in a new view and continuing a new IM conversation.

7. A method for implementing professional use of instant messaging as recited in claim 1 further includes the steps responsive to identifying a user entered view conversations option, displaying saved IM conversations.

8. A method for implementing professional use of instant messaging as recited in claim 7 includes the steps of receiving a user selection of a saved IM conversation; and continuing the selected IM conversation.

9. A method for implementing professional use of instant messaging as recited in claim 1 includes the steps of identifying a user selection, linking a selected object to an IM conversation.

10. A method for implementing professional use of instant messaging as recited in claim 9 includes the steps of identifying a completed IM conversation or a window closed for the IM conversation; and automatically saving the IM conversation with the selected object.

11. Apparatus for implementing professional use of instant messaging comprising:
  a professional instant messaging management program including a plurality of computer executable instructions stored on a computer readable medium, said professional instant messaging management program executing said instructions;
  said professional instant messaging management program receiving user selections and displaying a flow of an IM conversation;
  said professional instant messaging management program identifying a user selection to pair a response with a previous request from the displayed flow of the IM conversation, and sending both the user entered response and the user selected previous request with the user entered response displayed following the user selected previous request; and
  said professional instant messaging management program identifying a completed IM conversation or a window closed for the IM conversation; and automatically saving the IM conversation.

12. Apparatus for implementing professional use of instant messaging as recited in claim 11 wherein said professional instant messaging management program identifies a user selection to add another user to the IM conversation; and adds another user to the IM conversation.

13. Apparatus for implementing professional use of instant messaging as recited in claim 12 wherein said professional instant messaging management program displays a window including the flow of the IM conversation to the added user.

14. Apparatus for implementing professional use of instant messaging as recited in claim 11 wherein said professional instant messaging management program receives a user selected request in the flow of the IM conversation and a user selected new topic; and displays the user entered request in a new view and continues a new IM conversation.

15. Apparatus for implementing professional use of instant messaging as recited in claim 11 wherein said professional instant messaging management program identifies a user selection and links a selected object to an IM conversation.

16. A computer program product for implementing professional use of instant messaging, said computer program product including a plurality of computer executable instructions stored on a computer readable medium, wherein said instructions, when executed by a processor, cause the processor to perform the steps of:
  displaying a flow of an IM conversation;
  identifying a user selection to pair a response with a previous request from the displayed flow of the IM conversation,
  receiving a user entered response and said user selected previous request; and
  sending both the user entered response and the user selected previous request with the user entered response displayed following the user selected previous request, and
  identifying a completed IM conversation; and automatically saving the IM conversation.

17. A computer program product as recited in claim 16 wherein said instructions, when executed by a processor, cause the processor to perform the steps of: receiving a user selected new topic and a user selected request in the flow of the IM conversation; and displaying the user entered request in a new view and continuing a new IM conversation.

18. A computer program product as recited in claim 16 wherein said instructions, when executed by a processor, cause the processor to perform the steps of: identifying a user selection and linking a selected object to an IM conversation; identifying a completed IM conversation or a window closed for the IM conversation; and automatically saving the IM conversation with the selected object.

19. A method for implementing professional use of instant messaging comprising:
  receiving user selections and displaying a flow of an IM conversation;
  identifying a user selection to pair a response with a previous request from the displayed flow of the IM conversation, and sending both the user entered response and the user selected previous request with the user entered response displayed following the user selected previous request; and
  identifying a completed IM conversation; and automatically saving the IM conversation.

* * * * *